United States Patent
Kannan et al.

(10) Patent No.: US 10,521,769 B1
(45) Date of Patent: Dec. 31, 2019

(54) STAKEHOLDER IMPACT ANALYSIS AND OPTIMIZATION

(71) Applicant: Massachusetts Mutual Life Insurance Company, Springfield, MA (US)

(72) Inventors: Gopika Kannan, West Hartford, CT (US); Jennifer Fabrizi, Amherst, MA (US); Robert Polkowski, Boston, MA (US)

(73) Assignee: Massachusetts Mututal Life Insurance Company, Springfield, MA (US)

( * ) Notice: Subject to any disclaimer, the term of this patent is extended or adjusted under 35 U.S.C. 154(b) by 695 days.

(21) Appl. No.: 14/572,243

(22) Filed: Dec. 16, 2014

Related U.S. Application Data

(60) Provisional application No. 61/919,082, filed on Dec. 20, 2013.

(51) Int. Cl.
| | | |
|---|---|---|
| *G06F 16/00* | (2019.01) | |
| *G06F 7/00* | (2006.01) | |
| *G06Q 10/10* | (2012.01) | |
| *G06F 21/62* | (2013.01) | |
| *G06F 16/22* | (2019.01) | |
| *G06F 16/28* | (2019.01) | |
| *G06F 16/35* | (2019.01) | |

(52) U.S. Cl.
CPC ....... *G06Q 10/103* (2013.01); *G06F 16/2291* (2019.01); *G06F 21/6218* (2013.01); *G06F 16/285* (2019.01); *G06F 16/35* (2019.01)

(58) Field of Classification Search
USPC .......................................................... 707/737
See application file for complete search history.

(56) References Cited

U.S. PATENT DOCUMENTS

| | | |
|---|---|---|
| 2001/0054032 A1 | 12/2001 | Goldman et al. |
| 2004/0006566 A1 | 1/2004 | Taylor et al. |
| 2007/0136429 A1 | 6/2007 | Fine et al. |
| 2008/0301105 A1 | 12/2008 | Chen et al. |
| 2009/0307129 A1 | 12/2009 | Matkowsky et al. |
| 2010/0325214 A1 | 12/2010 | Gupta |
| 2011/0113358 A1* | 5/2011 | Nielsen ................. G06Q 10/10 715/765 |
| 2012/0179508 A1* | 7/2012 | Sefland ............. G06Q 10/0633 705/7.27 |
| 2012/0197809 A1* | 8/2012 | Earl ..................... G06Q 10/103 705/301 |

(Continued)

*Primary Examiner* — Usmaan Saeed
*Assistant Examiner* — Raquel Perez-Arroyo
(74) *Attorney, Agent, or Firm* — Eric L. Sophir; Dentons US LLP

(57) ABSTRACT

The embodiments describe computer implemented systems and methods for stakeholder analysis and classification, which may be used within knowledge ecosystems. The embodiments may include the selection and implementation of one or more stakeholder analysis models, where one or more variables describing one or more relevant stakeholder aspects may be used to assess and classify one or more stakeholders. The analysis may be used to determine the relative impact and influence of the one or more stakeholders on a project and the impact that one or more projects may have on one or more stakeholders. This analysis may consequently improve stakeholder relationships through the creation of suitable stakeholder policies.

4 Claims, 5 Drawing Sheets

(56) References Cited

U.S. PATENT DOCUMENTS

| | | | |
|---|---|---|---|
| 2012/0221589 A1* | 8/2012 | Shahar | G06F 16/248 |
| | | | 707/758 |
| 2013/0007036 A1 | 1/2013 | Childs et al. | |
| 2013/0086495 A1 | 4/2013 | Guzansky et al. | |
| 2013/0091456 A1 | 4/2013 | Sherman et al. | |
| 2013/0110641 A1 | 5/2013 | Ormont et al. | |
| 2013/0275429 A1* | 10/2013 | York | G06Q 50/01 |
| | | | 707/737 |
| 2014/0075004 A1 | 3/2014 | Van Dusen et al. | |

\* cited by examiner

STAKEHOLDER IMPACT ANALYSIS AND OPTIMIZATION

CROSS-REFERENCE TO RELATED APPLICATIONS

This application claims priority to U.S. Provisional Patent Application Ser. No. 61/919,082, entitled "Stakeholder Impact Analysis and Optimization," filed Dec. 20, 2013, which is hereby incorporated by reference in its entirety.

TECHNICAL FIELD

The present disclosure relates in general to knowledge management systems and methods, and more specifically to stakeholder analysis within knowledge ecosystems.

BACKGROUND

In project management, there is great interest in attempting to predict the behavioral intentions of stakeholder groups.

Stakeholders groups may include people, parties, companies and any entity that may have an interest, may be affected by, or may have an interest on a project. Some examples of stakeholders may include customers/members, shareholders, suppliers, referral sources, distribution partners, financiers, government, labor unions, communities, employees and other workgroups, units, functional areas, departments, etc.

Given that stakeholders are affected by and can significantly affect a project, the complex process of initiating, developing and maintaining stakeholder relationships in a coordinated and timely manner is, in many cases, vital to the relative success and sustainability of projects. Unfortunately, tools available in the art have failed to keep up with the changing nature of many projects.

There is a need for reliable adaptive systems able to predict stakeholder behaviors to facilitate the creation of successful stakeholder policies.

SUMMARY

Embodiments described herein include computer-implemented systems and methods for stakeholder analysis and classification, which may be used within knowledge ecosystems. The embodiments may include the selection and implementation of one or more stakeholder analysis models by a knowledge ecosystem where one or more variables describing one or more relevant stakeholder aspects may be used to assess and classify one or more stakeholders. The system utilizes knowledge from a knowledge base to assess and classify stakeholders based on the information (or variables) that describes the stakeholders. The stakeholder analysis described differs from known in the art methods by incorporating the use of knowledge from a knowledge base within a knowledge ecosystem. The analysis may be used to determine the relative impact and influence of the one or more stakeholders on a project and the impact that one or more projects may have on one or more stakeholders. The system described in the exemplary embodiments may be capable of proactively delivering knowledge into the flow of work of a team based on the needs of the role and the project.

The implementation of the exemplary methods within knowledge ecosystems may improve the predictive capability available from carefully analyzing the plurality of variables associated with stakeholders experiences and attitudes that influence their behavior and attitudes towards a project, which in turn may facilitate the creation of successful stakeholder policies and relationships.

In one embodiment, a computer-implemented method comprises receiving, by a computer, an input of a selection of a stakeholder, wherein the stakeholder is an entity that has a potential impact on an outcome of a project or the project has a potential impact on the stakeholder; inquiring, by the computer, about the stakeholder in a plurality of records in a system registry; determining, by the computer, an attribute of the stakeholder from the records in the system registry; classifying, by the computer, the stakeholder according to the potential impact that the stakeholder has on the outcome of the project based upon the determined attribute; and classifying, by the computer, the stakeholder according to the potential impact that the project has on the stakeholder based upon the determined attribute.

In another embodiment, a computer-implemented method comprises determining, by a computer, an attribute of a stakeholder from a record in a system registry; analyzing, by the computer, how the attribute affects the stakeholder in a selected project; automatically generating, by the computer, a matrix for display on a graphical user interface, wherein the matrix has a first axis having a first criteria and a second axis having a second criteria; and automatically identifying, by the computer, a point on the matrix associated with the stakeholder based upon the analyzed attribute.

In yet another embodiment, a computer-implemented method comprises receiving, by a computer, an input of data related to a project; indexing, by the computer, the inputted data and storing the inputted data in a database as information; processing, by the computer, the inputted data and storing the processed data in the database as knowledge, wherein knowledge comprises information that is acquired or derived by one or more participants in the project for use in a new project; receiving, by the computer, a request related to the new project; determining, by the computer, whether the request is for information; when the request is for information, retrieving, by the computer, information from the database; determining, by the computer, whether the request is for knowledge; and when the request is for knowledge, retrieving, by the computer, knowledge from the database.

The exemplary embodiments described herein are directed to improving the efficiency of processing knowledge information. The systems and methods use a specially-programmed computer system that has the capability to perform the complex computations and automated functionality that cannot be reasonably performed by a person. The computations and functionality are envisioned to be performed by a non-human system, including hardware, software, and/or firmware. The computations and functionality cannot be performed by a generic computer, but rather a specially-programmed computer that is configured to perform the complex computations and functionality described herein. The techniques and processes described herein may also improve the efficiency of the specially-programmed computer by performing discrete tasks that can more optimally process data.

Numerous other aspects, features and benefits of the present disclosure may be made apparent from the following detailed description taken together with the drawing figures.

Definitions

As used here, the following terms may have the following definitions:

"Knowledge" refers to information acquired or derived by one or more participants in one or more projects for use in one or more other projects.

"Knowledge management" refers to the process of acquiring, organizing, storing, sharing, and using knowledge by organizations or individuals.

"Knowledge map" refers to a diagram used for visualizing flow of knowledge and duties before, during, and after a project execution.

"Knowledge ecosystem" refers to people creating knowledge through networks of collaboration that may be supported by a technology network of knowledge bases and communication links.

"Knowledge content" refers to the work output produced by the members of a knowledge ecosystem, where this content may have a life cycle that matures from tribal knowledge to conventional wisdom through the structure of the ecosystem. Knowledge content may be in the form of a piece of documentation such as memos, notes, emails, directories, articles, white papers, and case studies, among others, where this documentation may be relevant to execute tasks of interest within an organization.

"Knowledge base" refers to a collection of knowledge content saved in an electronic storage system and that may be later retrieved for implementation in future projects.

"Knowledge based assignment module" refers to a module which may be part of a knowledge ecosystem which is responsible to gather necessary information to perform an optimal assignment of a set of employees to a set of projects.

"Stakeholder" refers to any person, group or entity that may have an impact on the outcome of a project or may be affected by the outcome of a project.

"Attribute" refers to one or more characteristics that describe one or more aspects of an object, project, document, or participant.

"Object" refers to any commodity with a non-trivial role in a project.

"Artifact" refers to any instance of a template including information of use in one or more projects. Types of artifacts may include project deliverables, project groundwork, and reference documents. Project deliverables may include documents which may be created and provided as a result of the completion of one or more stages of a project such as business requirements, test plans, test cases, project charter, and project scope. Project groundwork may include documents created to support the analysis during project execution, including diagrams, spreadsheets and questionnaires, among others. Reference documents may describe suitable approaches for implementing one or more artifacts according to the knowledge required by the project.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
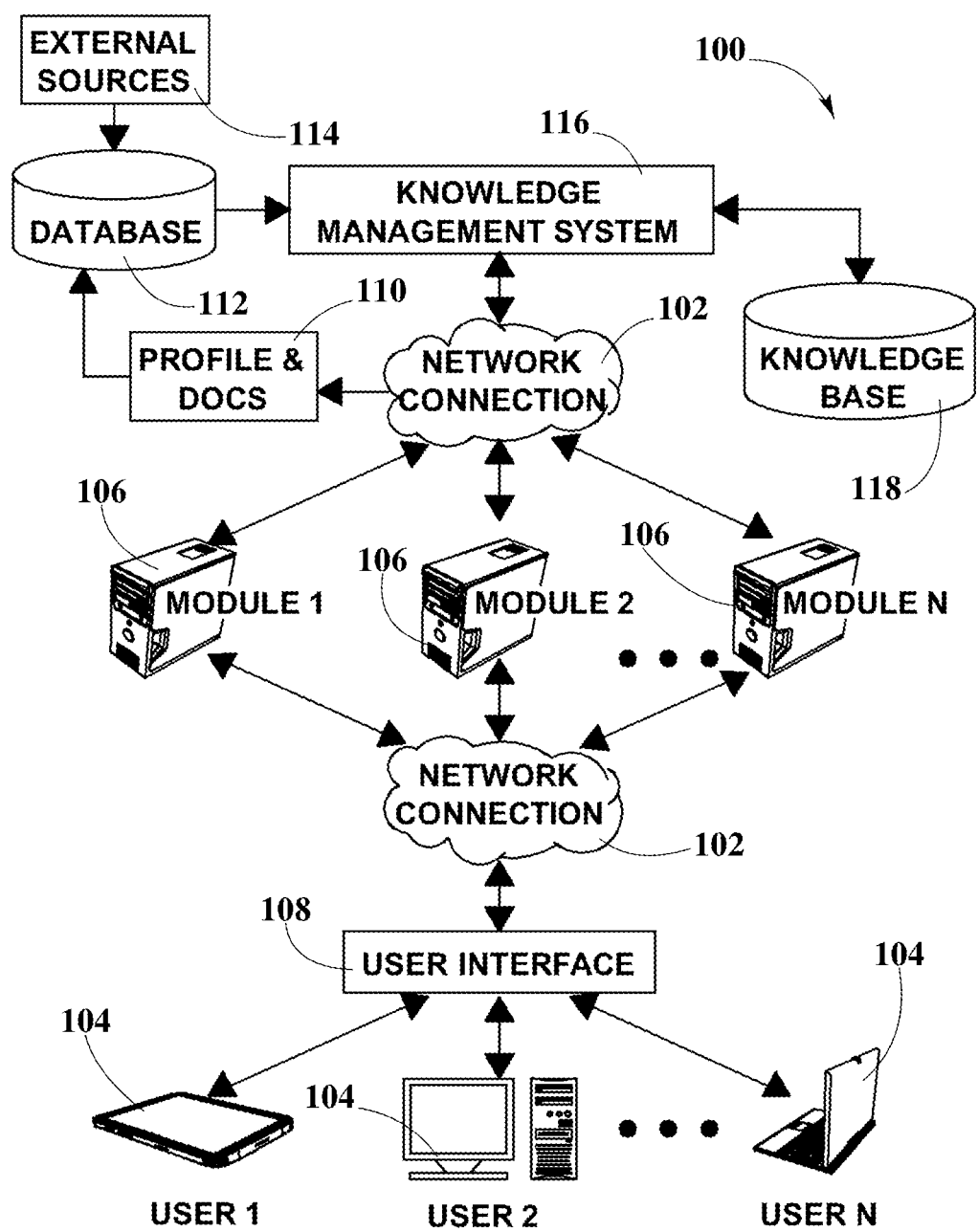
FIG. 1 shows a system architecture for a knowledge ecosystem, according to an exemplary embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

The exemplary embodiments described herein are directed to improving the efficiency of processing knowledge information. The systems and methods use a specially-programmed computer system that has the capability to perform the complex computations and automated functionality that cannot be reasonably performed by a person. The computations and functionality are envisioned to be performed by a non-human system, including hardware, software, and/or firmware. The computations and functionality cannot be performed by a generic computer, but rather a specially-programmed computer that is configured to perform the complex computations and functionality described herein. The techniques and processes described herein may also improve the efficiency of the specially-programmed computer by performing discrete tasks that can more optimally process data.

Embodiments described herein include computer-implemented systems and methods for stakeholder analysis and classification, which may be used within knowledge ecosystems. The embodiments may include the selection and implementation of one or more stakeholder analysis models where one or more variables describing one or more relevant stakeholder aspects may be used to assess and classify one or more stakeholders. The analysis may be used to determine the relative impact and influence of the one or more stakeholders on a project and the impact that one or more projects may have on one or more stakeholders. The system described in the exemplary embodiments may be capable of proactively delivering knowledge into the flow of work of a team based on the needs of the role and the project.

Knowledge Ecosystem

Knowledge ecosystems may include computer implemented project management systems, where the project management systems may provide services for organizing documents, communications, templates, among other forms of knowledge content, templates process flows and other knowledge content which may be managed by knowledge management system. This knowledge management system may be made available to users through a system interface, while the system interface may update the knowledge management system with newly acquired knowledge as it may be created during the execution of projects.

System Architecture and User Interface

FIG. 1 shows a an exemplary system architecture 100 for a knowledge ecosystem. The knowledge ecosystem described here may enable automated human-to-human collaboration through the use of system architecture 100. The disclosed system architecture 100 may include different components which may dynamically interact with each other through network connections 102. Network connections 102 may refer to any suitable connections between computers such as, for example, intranets, local area networks (LAN), virtual private networks (VPN), wireless area networks (WAN) and the internet among others.

In the knowledge ecosystem, one or more client computing devices 104 may display a graphical user interface 108 configured to receive information from one or more users and interact with one or more software modules 106. Examples of client computing devices 104 may include smartphones, desktop computers, laptop computers, tablets, and PDAs, among others. Software modules 106 may include any software used by key areas of an organization such as, for example, accounting software, human resources software, project management, organizational social networks, search engines and/or any other suitable software from where knowledge of an organization may be derived. In addition, each software module 106 may be executed by a server, a single computer or multiple computers in a distributed configuration.

User interface 108 displayed in client computing devices 104 may exhibit an intelligent feature for not only supporting human-computer interactions but also providing technology supported and socially enabled human-to-human collaboration for co-located and geographically diverse work teams alike. User interface 108 may act as a single portal for accessing different software modules 106 and may be tailored to users depending on the access rights predetermined for those specific users. In another embodiment, an independent user interface 108 may exist for each software module 106.

Interaction between client computing devices 104 and software modules 106 may generate raw data 110 such as user profiles, documents, project information, metrics, emails and worksheets among others. Software modules 106 may transmit raw data 110 through network connection 102 to a database 112 for storing. Database 112 may be implemented through known in the art database management systems (DBMS) such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data.

External sources 114 may also feed raw data 110 to database 112. Examples of external sources 114 may include the world wide web, external social networks, external consulting, third party providers, external project sources and/or any external data that may serve to produce knowledge.

Finally, a knowledge management system 116 may manage and process the flow of information within the knowledge ecosystem. For example, knowledge management system 116 may retrieve and process raw data 110 stored in database 112 to consequently derive knowledge from raw data 110. Knowledge may then be stored in a knowledge base 118. Knowledge management system 116 may also pull knowledge from knowledge base 118 when requested by client computing devices 104 or software modules 106.

Knowledge management system 116 may include one or more computers suitable for executing knowledge management software according to embodiments described here. Knowledge base 118 may be implemented through known in the art database management systems (DBMS) such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data.

Figure 2:
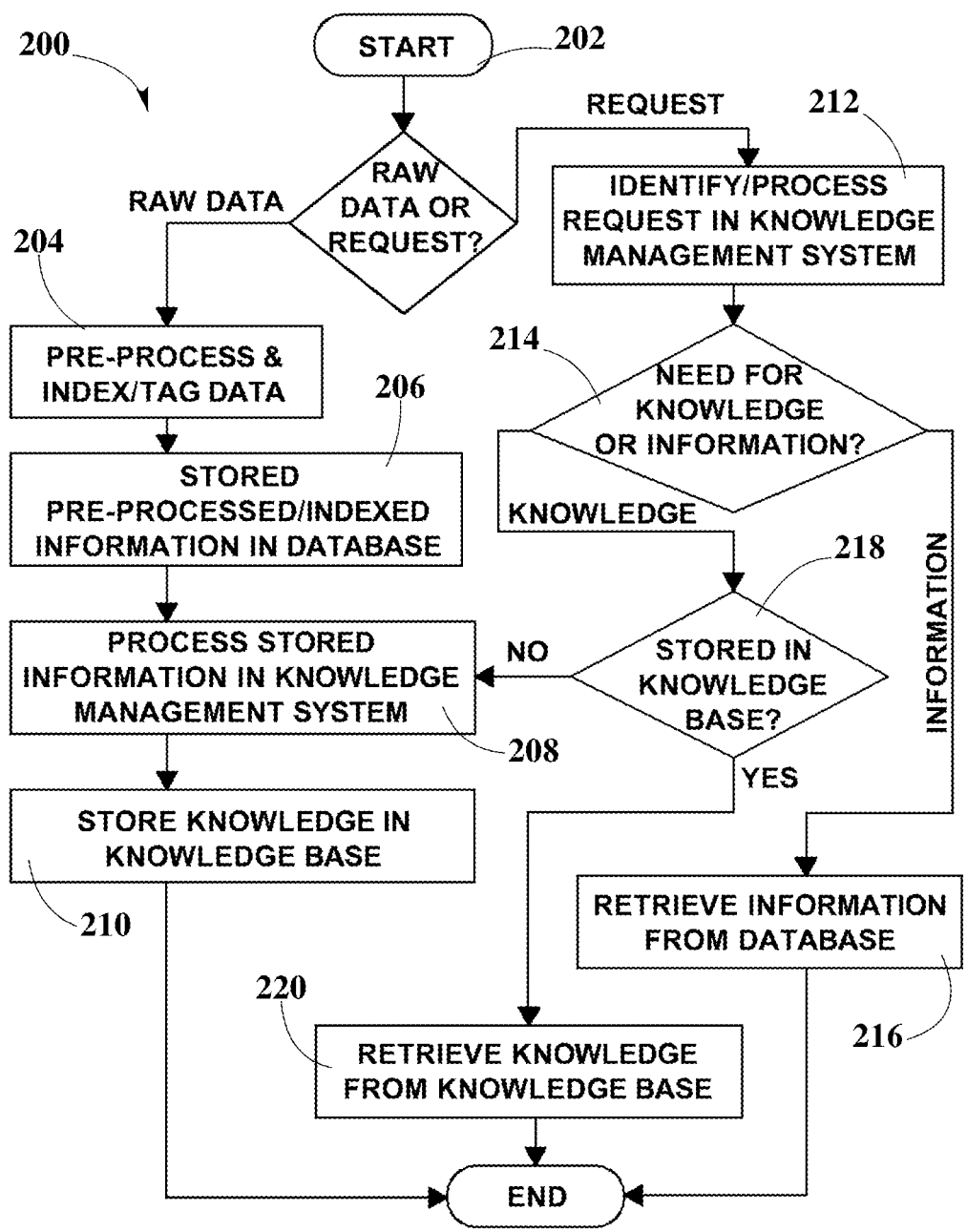
FIG. 2 is a flowchart of input management process, according to an exemplary embodiment.

FIG. 2 is a flowchart of input/request management process 200, according to an embodiment.

The process may start when raw data or requests may be generated from the interaction of one or more client computing devices with one or more software modules within a knowledge ecosystem. Examples of client computing devices may include smartphones, desktop computers, laptop computers, tablets, and PDAs, among others. Software modules may include any software used by key areas of an organization such as, for example, accounting software, human resources software, organizational social networks, project management, search engines and/or any other suitable software from where knowledge of an organization may be derived. In addition, each software module may be executed by a server, a single computer or multiple computers in a distributed configuration.

Raw data may include user profiles, documents, project information, metrics, emails and worksheets, among others. Requests may include the demand for information or knowledge.

Software modules may classify between raw data or requests, at step 202. Subsequently, at step 204, software modules may send raw data to a database where one or more sets of raw data may be analyzed, classified, indexed, and tagged using one or more information processing algorithms designed to process one or more types of data, allowing the conversion of raw data into preprocessed information. In some embodiments, this process may be done using state of the art data mining, and other suitable data processing tools. The database may be implemented through known in the art database management systems (DBMS) such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data.

The database may store the preprocessed information at step 206, until a knowledge management system determines that there is a need for analyzing one or more sets of preprocessed information. Knowledge management system may include one or more computers suitable for executing knowledge management software according to embodiments described here.

The need for analyzing one or more sets of preprocessed information may arise from a client computing device generated request or from a software module generated request. If the knowledge management system determines there is a need for new knowledge within the knowledge ecosystem, knowledge management system may analyze one or more sets of preprocessed information according to the identified knowledge needs, at step 208. In some embodiments, knowledge management system may use additional processing tools from one or more software modules during the analysis of preprocessed information.

Following step 208, knowledge management system may analyze and compare one or more sets of processed information against one or more knowledge needs identified within the knowledge ecosystem. Knowledge management system may identify knowledge from the processed information, where this knowledge may be useful for improving the performance of one or more tasks in a project. At step 210, the knowledge management system may store the identified knowledge in a knowledge base and the process may end. In some other embodiments, knowledge management system may store only indexed references or tags of the one or more useful processed information sets or subsets in knowledge base.

Knowledge base may be implemented through known in the art database management systems (DBMS) such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data.

At step 202, software modules may send requests to the knowledge management system for analysis, at step 212. Knowledge management system may classify the requests to determine if there is a need for knowledge or for information, at step 214. In one embodiment, information may refer to facts or details about users, tasks, projects, and general activities within the knowledge ecosystem. In one example, information may include a user's name. In one embodiment, knowledge may refer to information, acquired, processed or derived by client computing devices, software modules, and knowledge management system, where this information may be useful for improving one or more tasks in one or more projects. In an example where the information is a user's name, if a nick name is used instead of the full name, it may be more successful in closing sales, so a request may desire the nick name instead of the full name.

Following the process, if there is a need for information, knowledge management system may retrieve the necessary one or more sets or subsets of information from the database, at step 216, and the process may end.

If there is a need for knowledge, knowledge management system may determine if the necessary knowledge to address the identified need is already stored in the knowledge base, at step 218. If the necessary knowledge is already stored in the knowledge base, then knowledge management system may retrieve the required knowledge from the knowledge base, at step 220. If necessary knowledge is not yet stored in the knowledge base, knowledge management system may retrieve and analyze one or more sets of preprocessed data from the database and subsequently store identified knowledge in knowledge base, at step 210, and the process may end.

Stakeholder Analysis

According to some embodiments, stakeholder analysis may precede the finalizing of project proposals. In early stages of policy formulation, stakeholder analysis may help to increase the likelihood of acceptance and sustainability of a project. Stakeholder analysis may help the project management team to build strategies to overcome opposition, and channel information and resources to promote and sustain one or more projects. The stakeholder analysis may be integrated into the knowledge ecosystem to increase adaptability of stakeholder policies and awareness of stakeholders position in each stage of a project. This analysis can be performed automatically and/or simultaneously with other components, and it can improve the operational efficiency of the knowledge management system.

Figure 3:
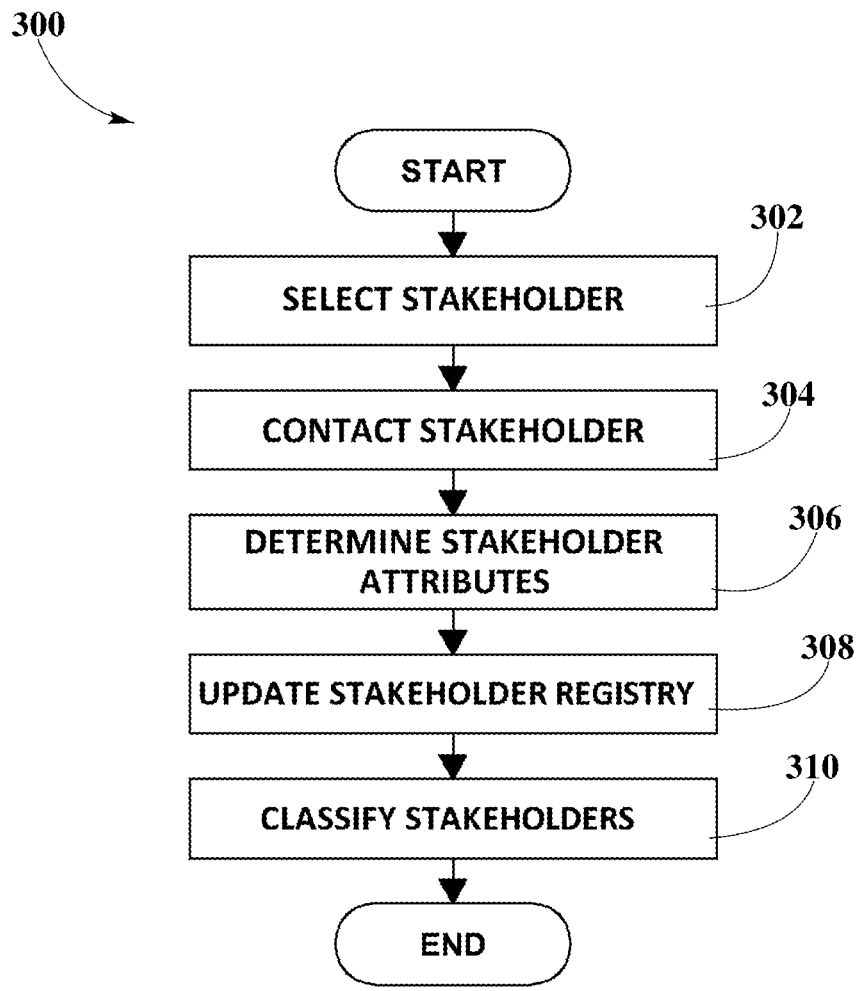
FIG. 3 is a flowchart of a stakeholder classification process, according to an exemplary embodiment.

FIG. 3 is a flowchart of a stakeholder analysis process 300, according to an embodiment. First, the one or more stakeholders to be analyzed may be identified and selected 302.

The identification may be performed by a user through a user interface linked to a suitable software module. User interfaces may be displayed in client computing devices may exhibit an intelligent feature for not only supporting human-computer interactions but also providing technology supported and socially enabled human-to-human collaboration for co-located and geographically diverse work teams alike. User interfaces may act as a single portal for accessing different software modules and may be tailored to users depending on the access rights predetermined for those specific users. In another embodiment, an independent user interface may exist for each software module or for a group of associated software modules. In some embodiments, a software module may be configured to automatically identify and select stakeholders based on information and knowledge provided by the knowledge management system. Where each software module may be executed by a server, a single computer or multiple computers in a distributed configuration.

Knowledge management system 116 may include one or more computers suitable for executing knowledge management software according to embodiments described here. Knowledge management system may be linked to a Knowledge base which may be implemented through known in the art database management systems (DBMS) such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or other database types that may organize collections of data.

Then, a user may contact 304 stakeholders to update information in the system registry through a user interface linked to a suitable software module, this information may be handled by a suitable module and may be stored in a database or processed in the knowledge management system. Suitable databases may be implemented through known in the art database management systems (DBMS) such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data.

According to some embodiments, knowledge management system may classify the stakeholders in groups in the system registry, according to inputs given by users or using previous knowledge, stored in the knowledge base. Knowledge management system may generate sets of rules, actions or required information related to different stakeholders within different stakeholder groups. The sets of rules, actions or required information may serve to prepare groundwork related to stakeholder policies. Stakeholder groups may include end users of a project, operational units and sponsors, among others. Knowledge management system may store relevant knowledge about stakeholders in a knowledge base.

Afterwards, the one or more suitable modules working in conjunction with the knowledge management system may determine 306 the attributes or relevant characteristics of the stakeholders. The determination of the stakeholder attributes may involve a qualitative assessment. Then, the suitable modules may update 308 the necessary information may in a system registry, within a suitable database. Later, suitable modules working in conjunction with the knowledge management system may classify 310 the stakeholders according to their relative impact on the project and the impact that that the project may have on them.

Knowledge management system may be capable of performing qualitative and quantitative analysis of stakeholders based on knowledge stored in a knowledge base. According to some embodiments, the system may compare the behavior of stakeholders with similar attributes in similar projects to derive insights on the appropriate policies that may be defined for a stakeholder. According to some embodiments, knowledge management system may be capable of deriving suitable best practices for a project, based on a comparative analysis of projects over time.

According to an embodiment, knowledge management system may provide one or more user suitable reference content related to the correct analysis of the impact that one or more stakeholders may have on a project or a project may have on one or more stakeholders.

According to some embodiments, knowledge management system may determine the impact that one or more stakeholders may have on a project or a project may have on one or more stakeholders based on best practices and knowledge stored in a knowledge base about previous stakeholder experiences. According to some embodiments, knowledge management system may determine the impact that one or more stakeholders may have on a project or a project may have on one or more stakeholders also including risk profiles.

Knowledge management system may also identify attributes of stakeholders that may be considered as aspects of risk for a project. Knowledge management system may further classify the aspects of risk according to their relevance to the outcome of the project.

Analysis process 300 may lead to the successful recognition of the stakeholders' roles and facilitate the formulation of policies that may improve the stakeholders' relationship with the project.

Figure 4:
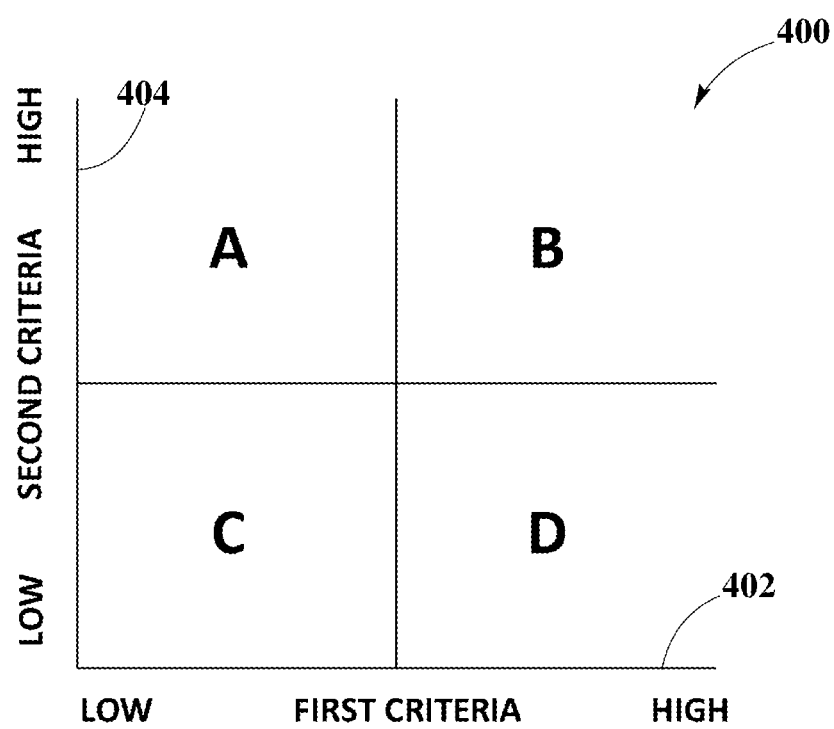
FIG. 4 shows a stakeholder matrix, according to an exemplary embodiment.

FIG. 4 shows a stakeholder matrix 400, according to an embodiment. Stakeholder matrix 400 may be one of the tools that may be utilized by a knowledge management system when performing a stakeholder analysis. Stakeholder matrix 400 may be generated by a suitable software module. Knowledge management system may include one or more computers suitable for executing knowledge management software according to embodiments described here. Software modules may be executed by a server, a single computer or multiple computers in a distributed configuration.

In a two dimensional stakeholder matrix 400, two relevant type of stakeholders attributes may be mapped on the two axes, for example power or influence on a first axis 402 and interest or resistance on a second axis 404, and stakeholders may given a relative position on the grid according to the assessment previously performed. In this manner, stakeholder matrix 400 may provided a categorization and analysis of which stakeholders may gain or lose from a proposed reform and whether they can significantly impact the project. In one embodiment, the stakeholders can be prioritized based upon the impact to or from the stakeholder with regard to the particular project. Knowledge base may include stored knowledge that may allow a decision engine and or any suitable modules within a knowledge ecosystem to determine power/influence or interest/resistance of one or more stakeholders. Decision engine may also use knowledge acquired or derived by knowledge management system to determine the power/influence or interest/resistance of one or more stakeholders.

Figure 5:
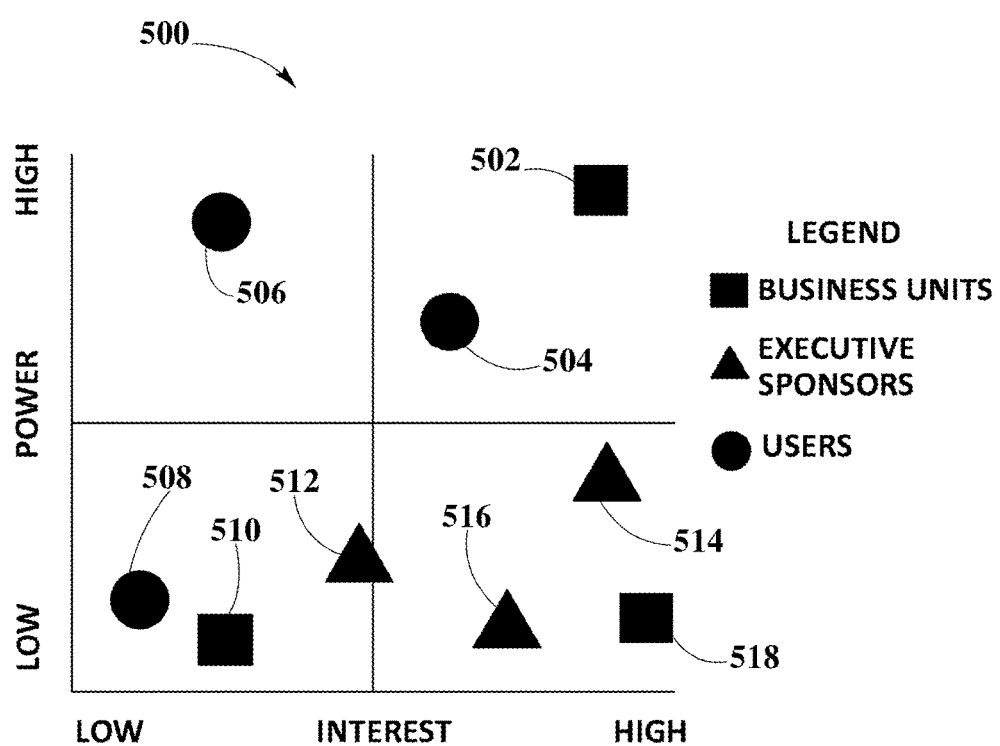
FIG. 5 shows an example of stakeholder classification, according to an exemplary embodiment.

FIG. 5 shows an example of an implementation of a stakeholder matrix 400. Interest vs. power matrix 500 includes the classification of business unit 502, user 504, user 506, user 508, business unit 510, executive sponsor 512, executive sponsor 514, executive sponsor 516 and business unit 518.

Example #1 is an embodiment of a stakeholder matrix 400. FIG. 5 shows interest vs. power matrix 500, where stakeholders may be classified, according to an embodiment. Interest vs. power matrix 500 may allow to identify key stakeholders and establish suitable policies to win their support. In example #1, stakeholders may be represented as triangles, squares, and circles; where triangles may represent executive sponsor, circles may represent user within a knowledge ecosystem, and squares may represent business unit. Interest vs. power matrix 500 may allow to easily see which stakeholders may be expected to be blockers or critics, and which stakeholders may be advocates and supporters of a developing project.

According to some embodiments, knowledge management system may determine the impact that one or more stakeholders may have on a project or a project may have on one or more stakeholders based on best practices and knowledge stored in a knowledge base about previous stakeholder experiences.

As it may be seen in FIG. 5, lots of effort may be needed to be put into persuading business unit 502 and user 504 of the benefits of the project. User 506 may also need to be managed well and kept satisfied as powerful supporter. While user 508, business unit 510, and executive sponsor 512 may need to be monitored with minimum effort; and executive sponsor 514, executive sponsor 516 and business unit 518 may just be kept informed of the development of the project.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A computer-implemented method comprising:
    collecting, by a computer, raw data comprising profile data of a plurality of users and an input data comprising exchange of communications between the plurality of users generated from a plurality of interactions between the plurality of users operating a plurality of user interfaces and a plurality of software modules, wherein the plurality of user interfaces are displayed by the computer on a plurality of client computing devices associated with the plurality of users;
    collecting, by the computer, a plurality of records from a plurality of external sources comprising at least a social networking source, wherein the plurality of records corresponds to social networking activity of at least one user within the plurality of users, wherein the plurality of records are stored by the computer in a second database, wherein the plurality of records comprises at least one attribute associated with the at least one user within the plurality of users;
    tagging and indexing, by the computer, the raw data, the input data, and the plurality of records to create knowledge and information data comprising one or more attributes associated with the plurality of users;
    receiving, by the computer, from a client computing device, a request associated with a new project, the request comprising at least one attribute of the new project;
    selecting, by the computer, one or more users from the plurality of users for the new project based on matching of the at least one attribute of the new project with the one or more attributes within the knowledge and the information data;
    generating, by the computer for the new project, a multi-dimensional matrix comprising at least two axis corresponding to the one or more users selected for the new project, the multi-dimensional matrix comprising at least a first axis representing a first value corresponding to an influence of each user of the one or more users and a second axis representing a second value corresponding to an interest of the each user in the new project;
    displaying, by the computer on the client computing device, a graphical user interface comprising the multi-dimensional matrix, wherein a representation of each user is displayed at a relative position on the multi-dimensional matrix according to each user's first and the second value, wherein the representation of each user is prioritized based on their relative positions on the multi-dimensional matrix, wherein the computer server displays a different indicator for each user, each indicator is represented as a different geometric shape corresponding to an attribute classification of the user;
    in response to a selection of a subset of users from the one or more users, generating, by the computer, a record listing users for the execution of the new project; and
    presenting, by the computer, for display on a computing device of each of the subset of users, a user interface tailored for each user based upon access rights for each user to access different software modules according to their relative knowledge and information data corresponding to the new project.

2. The computer-implemented method according to claim 1, wherein the request is a user-generated request.

3. The computer-implemented method according to claim 1, wherein the request is a computer-generated request.

4. The computer-implemented method according to claim 1, wherein data associated with the new project comprises a document, project information, a metric, an email, and a worksheet.

\* \* \* \* \*